United States Patent [19]

Hanaoka et al.

[11] 4,118,747
[45] Oct. 3, 1978

[54] COMPOSITE MAGNETIC HEAD

[75] Inventors: Naohiro Hanaoka, Hachioji; Misao Shimoda, Hamura, both of Japan

[73] Assignee: Olympus Optical Co., Ltd., Tokyo, Japan

[21] Appl. No.: 774,402

[22] Filed: Mar. 4, 1977

[30] Foreign Application Priority Data

Mar. 10, 1976 [JP] Japan .............................. 51-29084[U]

[51] Int. Cl.² .......................... G11B 5/20; G11B 5/28
[52] U.S. Cl. .................................... 360/121; 360/123; 360/125
[58] Field of Search ............... 360/121, 123, 125, 118, 360/66; 336/178, 183; 29/606, 603

[56] References Cited

U.S. PATENT DOCUMENTS

| | | | |
|---|---|---|---|
| 2,418,542 | 4/1947 | Camras | 360/66 |
| 3,969,770 | 7/1976 | Cavallari | 360/121 |
| 4,012,783 | 3/1977 | Hanaoka | 360/125 |

OTHER PUBLICATIONS

IBM Tech. Disc. Bulletin, W. M. Arrington et al, Cross Pole Magnetic Head, vol. 15, No. 6, Nov. 1972, p. 1872.

*Primary Examiner*—Alfred H. Eddleman
*Attorney, Agent, or Firm*—Ostrolenk, Faber, Gerb & Soffen

[57] ABSTRACT

A composite magnetic head including a record/playback gap and an erase gap comprises a straight central core, a pair of arcuate lateral cores having their ends disposed in opposing relationship with the opposite ends of the central core disposed therebetween, each of the lateral cores being formed with a bobbin carrying portion at its one end which extends in a direction perpendicular to the length of the central core, a bobbin having a central flange and a pair of flanges at the opposite ends, the central flange being formed with an opening for receiving the central core and the bobbin being formed with a slot extending through the entire length of the bobbin including the flanges at the opposite ends for receiving the lateral cores, the slot extending in a direction perpendicular to the opening which receives the central core, and a pair of coils disposed between the central flange and the respective end flanges, the central core and the lateral cores forming a record/playback gap and an erase head at their one end when the cores and the bobbin are assembled together by inserting the remote end of the central core into the opening and inserting one end of the lateral cores into the slot.

4 Claims, 5 Drawing Figures

COMPOSITE MAGNETIC HEAD

BACKGROUND OF THE INVENTION

The invention relates to a composite magnetic head. A composite magnetic head represents an integral assembly having a record/playback gap as well as an erase head. A conventional assembly is shown in FIG. 1. Referring to FIG. 1, a composite magnetic head 1 comprises a central core 2, a pair of lateral cores 3, 4 disposed on the opposite sides of the core 2 so as to hold it therebetween, and a pair of bobbins 7, 8 carrying coils 5, 6 thereon. The bobbins are fitted over a rear portion or a lower portion, as viewed in this Figure, of the lateral cores 3, 4 which extend in a direction toward each other. An erase gap 9 is defined between the cores 2, 3 by inserting a suitable gap forming material into the spacing formed between their front ends or in the upper ends as viewed in this Figure. Similarly a record/playback gap 10 is defined between the cores 2, 4 by fitting a gap forming material into the spacing between their front ends. The bobbins have flanges at their opposite ends, and conductive terminals 11, 12 are fixedly mounted on flanges 7a, 8a which are located remote from the central core 2. These terminals are connected with lead wires of both coils 5, 6.

With the construction of such a composite magnetic head, the cores 2 to 4 are separate members, so that they had to be assembled together by using a special ruler or jig, otherwise the gap defining portions may be displaced in a direction toward and away from the head surface or in a direction crosswise of the magnetic track, resulting in the difficulty in producing a smooth head surface and gaps having a sufficient width.

SUMMARY OF THE INVENTION

It is an object of the invention to provide a composite magnetic head which completely eliminates the above difficulty by employing a specially designed bobbin construction which permits the cores to be assembled integrally.

In accordance with the invention, a magnetic head having gaps of a high dimensional accuracy can be assembled by merely inserting a central core and a pair of lateral cores into an opening and a slot which are formed in a bobbin with a high accuracy.

DESCRIPTION OF PREFERRED EMBODIMENT

Figure 1:
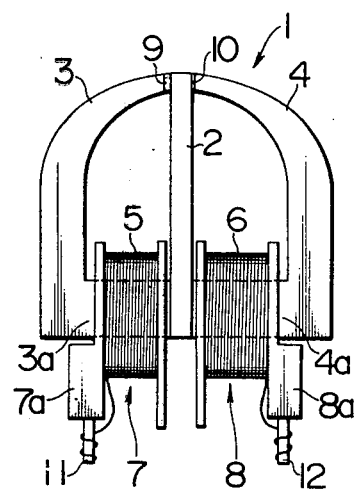
FIG. 1 is a plan view of a conventional composite magnetic head.
Figure 2:
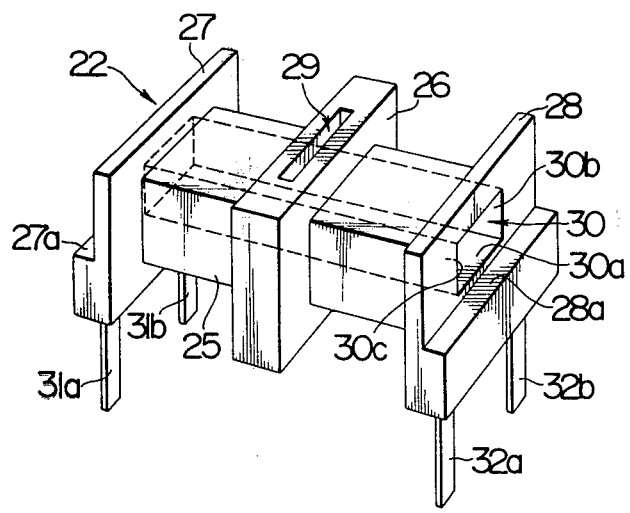
FIG. 2 is a perspective view of a bobbin which is utilized in forming the composite magnetic head of the invention.

An embodiment of the invention will be described below with reference to FIGS. 2 to 5. FIG. 2 shows a bobbin 22 which is used to construct a composite magnetic head 21 (see FIG. 4) of the invention. The bobbin 22 includes a body 25 on which a pair of coils 23, 24 (see FIG. 3) are disposed. The body is centrally formed with a flange 26, and is also formed with a pair of end flanges 27, 28 at its opposite ends. The central flange 26 is formed with an opening 29 which extends in a fore and aft direction or vertically as viewed in this Figure, for receiving the central core. A slot 30 extends through the full length of the body 25 in a direction perpendicular to the opening 29, and communicates with the latter. The end flanges 27, 28 are formed with steps 27a, 28a, respectively, at a position below the slot 30. In the rear portion, both end flanges 27, 28 have conductive terminals 31a, 31b and 32a, 32b fixedly mounted thereon. The bobbin 22 may be integrally molded from a synthetic resin material, for example.

Figure 3:
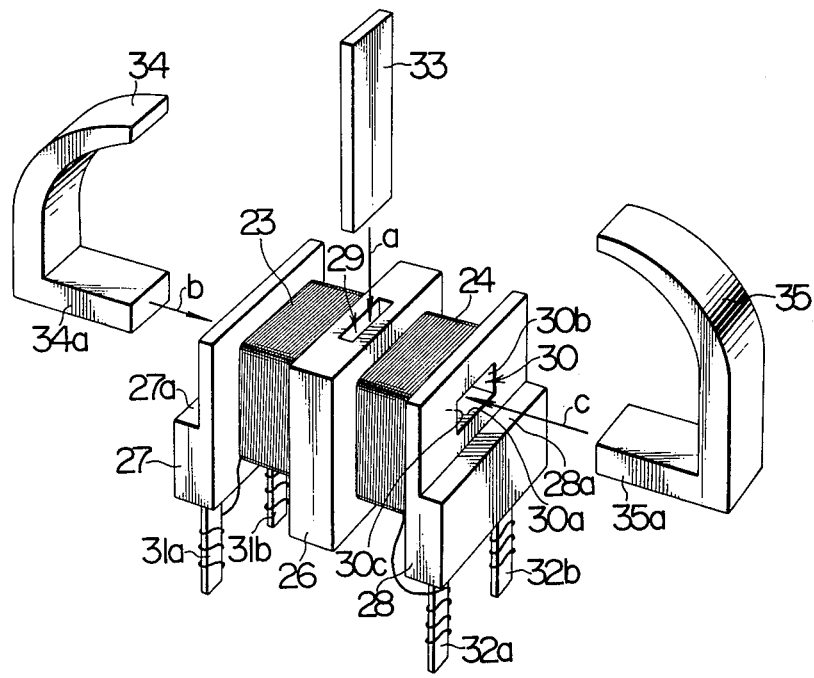
FIG. 3 is an exploded, perspective view of the composite magnetic head of the invention.
Figure 4:
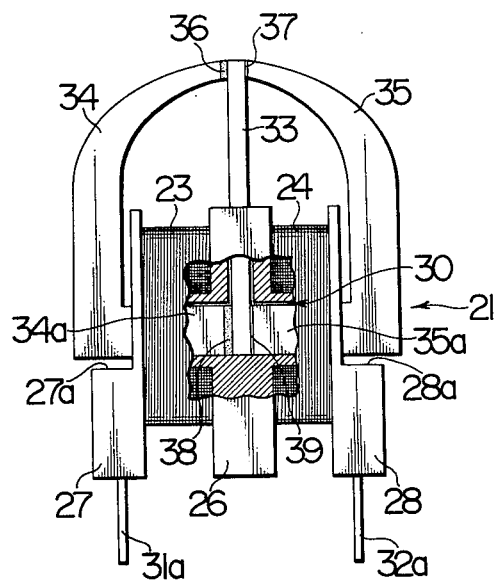
FIG. 4 is a plan view of the assembled, composite magnetic head, with a central portion thereof being broken away to show the interior construction.
Figure 5:
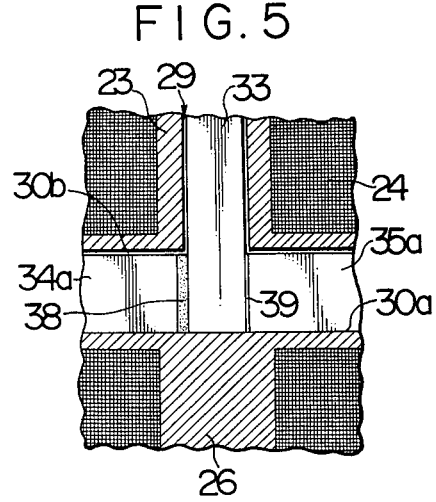
FIG. 5 is an enlarged view showing the central portion broken away in FIG. 4.

As shown in FIG. 3, a pair of coils 23, 24 are disposed on the body 25 of the bobbin 22 and located intermediate the flanges 26, 27, 28, the lead wires of the coils being connected with the conductive terminals 31a to 32b. A central core 33 and a pair of lateral cores 34, 35 are then provided. These cores are formed of a ferromagnetic material, for example, an alloy such as Permalloy or a metal oxide such as ferrite. The central core 33 is straight while the lateral cores 34, 35 are curved in arcuate form, facing toward each other when they are assembled together. The rear ends of the lateral cores 34, 35 are bent to extend toward each other, thus providing bobbin carrying portions 34a, 35a. The bobbin carrying portions 34a, 35a extend perpendicular to the length of central core 33, the length of central core 33 being measured in the direction of arrow a. During assembly, the rear portion of the central core 33 is initially fitted into the opening 29, as indicated by an arrow a, and then the bobbin carrying portions 34a, 35a of the lateral cores 34, 35 are fitted into the slot 30 from the opposite ends thereof, as shown by arrows b and c, until their respective ends bear against the opposite ends of the central core 33. The front end of each individual core is previously polished to a mirror finish, and a gap forming material such as Be-Cu alloy, glass or ceramic material is inserted between their ends and bonded therewith, thus forming an erase gap 36 and a record/playback gap 37 as shown in FIG. 4. Using a similar material, rear gaps 38, 39 are also formed. The gap forming material which forms the rear gaps 38, 39 may be previously applied to the abutting areas of either core by the use of an adhesive so that when the respective cores are fitted into the opening 29 and the slot 30, respectively, the material is held in place therebetween. Where the core has a high dimensional accuracy, the gap forming material of the rear gaps 38, 39 may be omitted.

When the cores 33 to 35 are assembled on the bobbin 22 in this manner, the bottom surface 30a and wall surfaces 30b, 30c (see FIG. 2) of the slot 30 are engaged by the rear end portions of the respective cores in abutting relationship to define their position, providing a head surface which is free from any unevenness and in which gaps of a high accuracy and having a sufficient width are formed. It will be noted that the opening 29 similarly serves to properly locate the central core 33.

What is claimed is:

1. A composite magnetic head including a record/playback gap and an erase gap, comprising:

a straight, central core;

a pair of lateral cores disposed in mutually opposite relationship with a front end and a rear end of the central core so as to hold the ends of the central core therebetween, each of the lateral cores having a rear portion which extends in a direction perpendicular to the length of the central core to provide a bobbin carrying portion;

a bobbin having a central flange and a pair of end flanges, the central flange being formed with an opening for receiving the central core and the bobbin being formed with a slot extending through the length thereof including both end flanges in a direction perpendicular to the opening;

a pair of coils respectively disposed between the central flange and each of the end flanges;

the central core being disposed in the opening and the bobbin carrying portions of the lateral cores being disposed in the slot in such a manner that a record/playback gap and an erase gap are defined between the opposite sides of the front end of the central core and each front end of the both lateral cores.

2. A composite magnetic head according to claim 1 in which the end flanges of the bobbin each have conductive terminals fixedly mounted thereon for connection with the lead wires of the coils.

3. A composite magnetic head according to claim 1 in which the bottom surface of the slot is finished to a high precision to define the position of the respective cores so that the front ends of the central core and the both lateral cores are maintained in proper abutting relationship to define the record/playback gap and the erase gap of a given size.

4. A composite magnet head assembly incorporating a record/playback gap and an erase gap comprising:

a coil supporting bobbin composed of a body having a straight, longitudinal opening extending along the length of the body and communicating with both ends thereof;

a flange surrounding the body intermediate the ends of said body and first and second end flanges surrounding the body at respective ends thereof;

said central flange having an opening extending therethrough and communicating with said longitudinal opening;

first and second lateral cores each comprised of a first and second arm, the ends of one arm of each of said lateral cores being curved generally toward the remaining straight arm;

the straight arms being inserted into respective opposite ends of the opening in said bobbin;

the cross-sectional configuration of said straight arms conforming to the cross-section of the longitudinal opening in said bobbin;

a central core being substantially straight and having a cross-section conforming to the cross-section of the opening in said intermediate flange;

one end of said central core being inserted into the opening in said central flange and being positioned between the ends of the straight arms of said lateral cores, the opening in said intermediate flange and the longitudinal opening in the body of said bobbin being adapted to position the opposite ends of said lateral cores in said central core so as to provide a first gap between said central core and the free curved end of one of said lateral cores and between the opposite side of said central core and the free end of the curved arm of the remaining lateral core;

a suitable insulating material of precision thickness being provided on the free end of the straight arm of each lateral core to provide precision spacing for the aforesaid gaps between the curved ends of said lateral cores and the adjacent surfaces of said central core.

* * * * *